(12) United States Patent
Kurokawa

(10) Patent No.: US 9,390,273 B2
(45) Date of Patent: *Jul. 12, 2016

(54) DEVICE MANAGING APPARATUS, DEVICE MANAGING SYSTEM, AND RECORDING MEDIUM STORING A SOFTWARE MANAGEMENT PROGRAM

(71) Applicant: RICOH COMPANY, LTD., Tokyo (JP)

(72) Inventor: Kaname Kurokawa, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 151 days.

This patent is subject to a terminal disclaimer.

(21) Appl. No.: 13/954,241

(22) Filed: Jul. 30, 2013

(65) Prior Publication Data

US 2013/0312118 A1 Nov. 21, 2013

Related U.S. Application Data

(63) Continuation of application No. 12/828,570, filed on Jul. 1, 2010, now Pat. No. 8,539,609.

(30) Foreign Application Priority Data

Jul. 6, 2009 (JP) .................................. 2009-159964

(51) Int. Cl.
*G06F 21/10* (2013.01)
*G06F 21/60* (2013.01)
*G06F 21/12* (2013.01)
(Continued)

(52) U.S. Cl.
CPC .............. *G06F 21/60* (2013.01); *G06F 21/121* (2013.01); *G06F 21/572* (2013.01); *G06F 21/608* (2013.01); *H04L 67/125* (2013.01); *H04L 67/34* (2013.01)

(58) Field of Classification Search
CPC ......... G06F 21/10; G06F 21/12; G06F 21/00; G06F 21/33; G06F 21/105; G06Q 20/367; G06Q 20/1235; H04L 63/0281
See application file for complete search history.

(56) References Cited

U.S. PATENT DOCUMENTS

| 7,024,564 B2 | 4/2006 | Pavlin et al. |
| 2006/0265337 A1* | 11/2006 | Wesinger, Jr. .................. 705/65 |
| 2008/0209569 A1 | 8/2008 | Araki |

(Continued)

FOREIGN PATENT DOCUMENTS

| JP | 9-190393 | 7/1997 |
| JP | 2008-171150 | 7/2008 |

(Continued)

OTHER PUBLICATIONS

Japanese official action dated Aug. 6, 2013 in corresponding Japanese patent application No. 2009-159964.

*Primary Examiner* — Shewaye Gelagay
*Assistant Examiner* — Carlton Johnson
(74) *Attorney, Agent, or Firm* — Cooper & Dunham LLP

(57) ABSTRACT

A device managing apparatus for managing software installed in at least one device includes a determination unit configured to determine whether a software item to be installed in the device requires license validation; a validation unit configured to perform a license validation operation on the software item for which the determination unit determines that license validation is required, depending on an available license for the software item; and a setting unit configured to set a license issued by the validation unit in the device in which the software item is installed.

14 Claims, 15 Drawing Sheets

(51) Int. Cl.
*G06F 21/57* (2013.01)
*H04L 29/08* (2006.01)

(56) References Cited

U.S. PATENT DOCUMENTS

2008/0244057 A1    10/2008    Kojima

2010/0293536 A1*    11/2010    Nikitin et al. ................. 717/168

FOREIGN PATENT DOCUMENTS

| JP | 2008-186392 | 8/2008 |
| JP | 2008-225878 | 9/2008 |
| JP | 2008-242660 | 10/2008 |
| JP | 2008-243180 | 10/2008 |

* cited by examiner

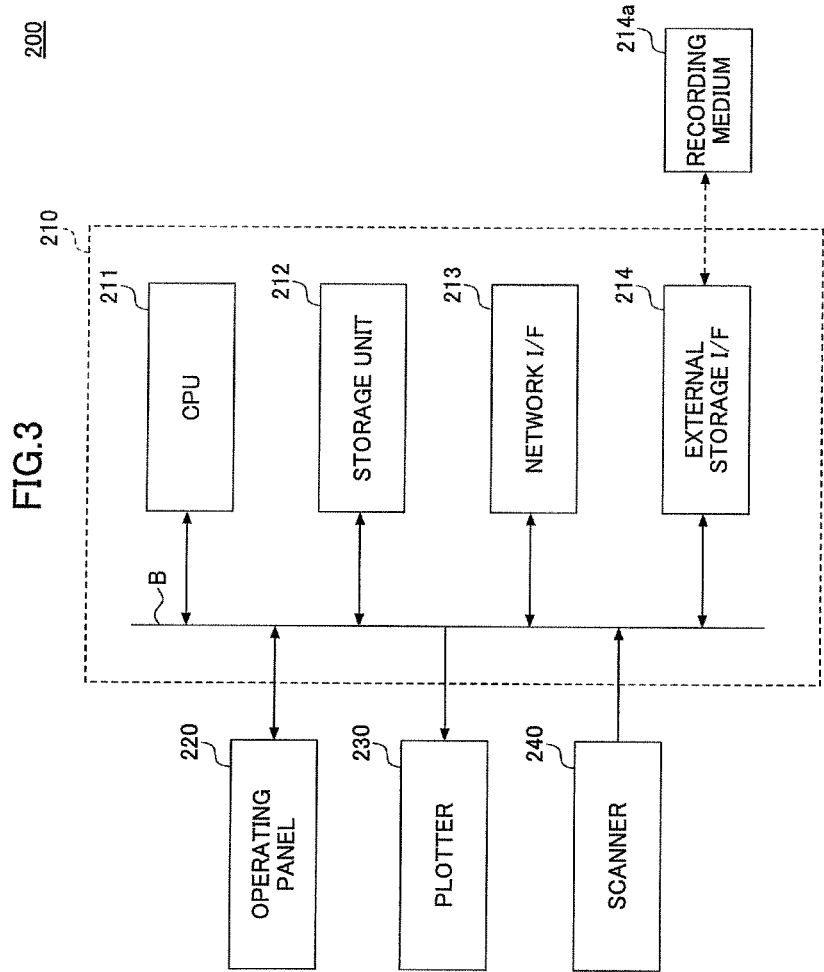

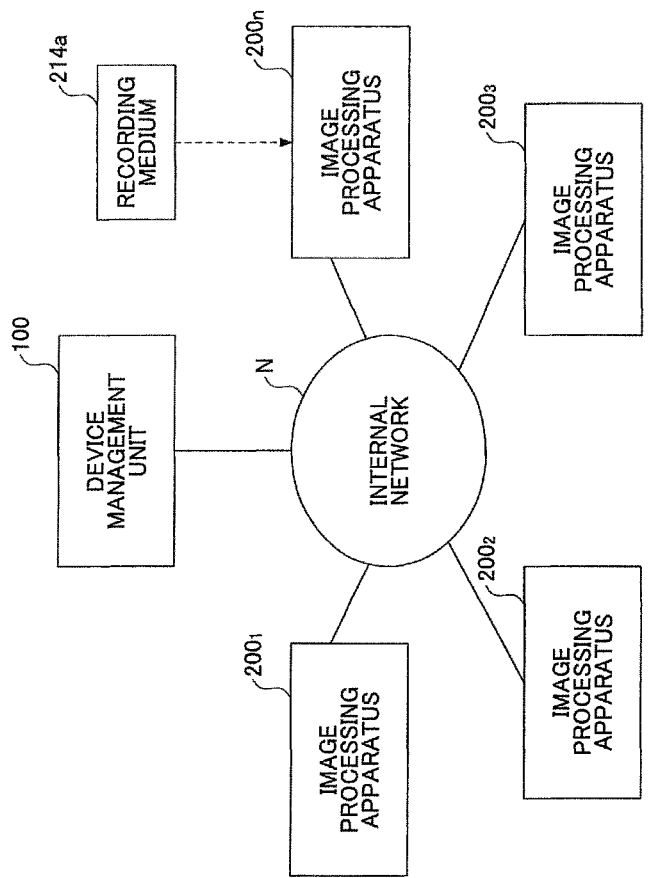

FIG.7

| PRODUCT ID | REGISTERED PRODUCT KEY ID | TOTAL NUMBER OF ISSUE-GRANTED LICENSES | ISSUED LICENSE KEY ID | NUMBER OF AVAILABLE LICENSES |
|---|---|---|---|---|
| SOFTWARE A | PRODUCT KEY A | 3 | - | 3 |
| SOFTWARE B | PRODUCT KEY B | 3 | Key1, Key2, Key3 | 0 |
| SOFTWARE C | PRODUCT KEY C | 10 | Key1, Key2, Key3, Key4, Key5 | 5 |
| ... | ... | ... | ... | ... |
| SOFTWARE X | PRODUCT KEY X | 5 | - | 5 |

| DEVICE ID | IP ADDRESS | MAC ADDRESS | TYPE ID | FUNCTION |
|---|---|---|---|---|
| DEVICE A | 192.168.XX.XX | 00:xx:xx:xx... | MFP01 | FULL-COLOR |
| DEVICE B | 192.168.XX.XX | 00:xx:xx:xx... | MFP02 | BLACK AND WHITE |
| DEVICE C | 192.168.XX.XX | 00:xx:xx:xx... | PRN01 | FULL-COLOR |
| ... | ... | ... | ... | ... |
| DEVICE X | 192.168.XX.XX | 00:xx:xx:xx... | MFP0X | BLACK AND WHITE |

| PRODUCT ID | LATEST VERSION | VERSION REQUIRING LICENSE VALIDATION | COMPATIBLE TYPE | SOFTWARE UPDATE RESULT |
|---|---|---|---|---|
| SOFTWARE A | 2.0 | 2.0 | MFP01, 02··· | ○ |
| SOFTWARE B | 1.2 | — | PRN01, 02··· | ○ |
| SOFTWARE C | 1.3 | 1.0 | MFP05, 06··· | × |
| ··· | ··· | ··· | ··· | ··· |
| SOFTWARE X | 1.2.3 | — | PRN10, 11··· | — |

51D

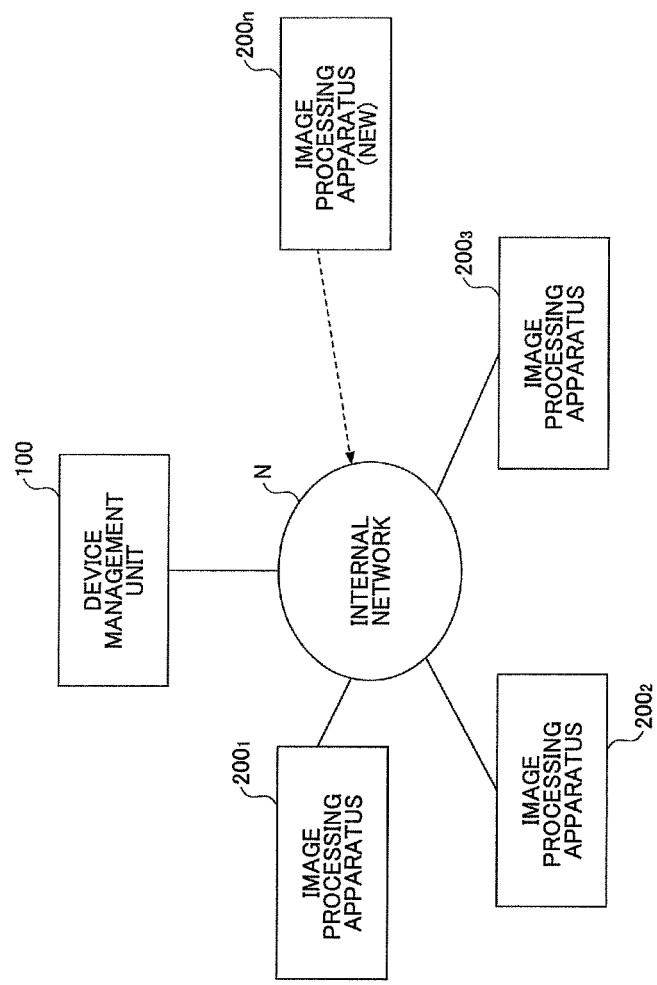

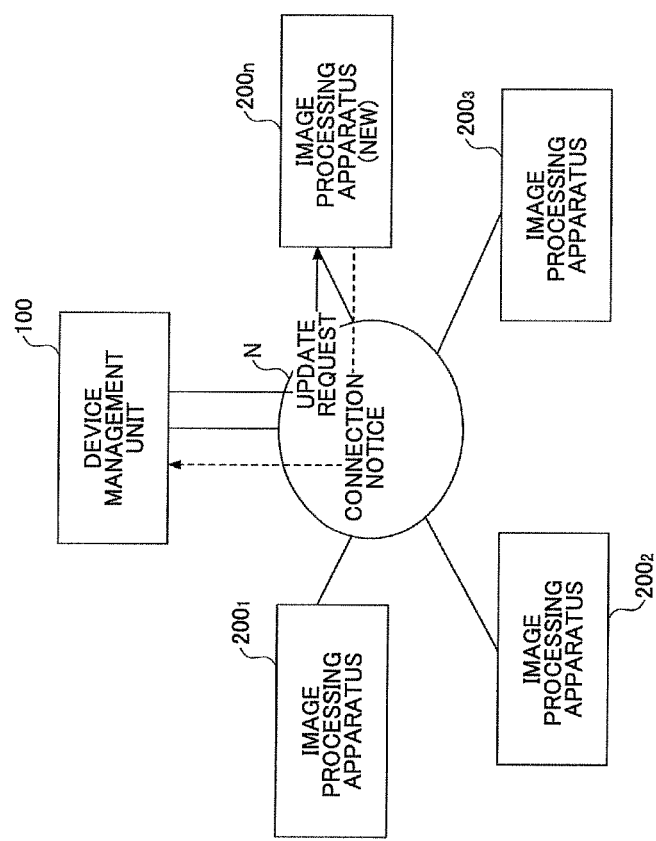

DEVICE MANAGING APPARATUS, DEVICE MANAGING SYSTEM, AND RECORDING MEDIUM STORING A SOFTWARE MANAGEMENT PROGRAM

CROSS-REFERENCE TO RELATED APPLICATIONS

This patent application is a Rule 1.53(b) continuation of application Ser. No. 12/828,570 filed on Jul. 1, 2010, which is based on, and claims priority under 35 U.S.C. §119 to, Japanese Patent Application No. 2009-159964 filed with the Japanese Patent Office on Jul. 6, 2009.

BACKGROUND OF THE INVENTION

1. Field of the Invention

The present invention generally relates to device managing systems for managing one or more devices that are connected via a data transmission path, such as a network. Particularly, the invention relates to a technology for managing software for an image processing apparatus as a managed device.

2. Description of the Related Art

Systems are known in which the status of an image processing apparatus, such as a multifunction peripheral (MFP) or a printer, is monitored by a device managing apparatus (device managing server) via a data transmission path, such as a network. In such a device managing system, a user can detect abnormality in one or more image processing apparatuses (management target devices) without actually visiting the location of the management target device.

In the above system structure, it is an important function of the device managing apparatus to manage the software environment of the management target devices. However, the user environment in which the device managing system is introduced may include as many as several thousand image processing apparatuses. In such a case, software management operation poses a serious burden to administrative personnel involved in the operation.

For example, Japanese Laid-Open Patent Application No. 2008-186392 discloses an automatic software update apparatus capable of performing a software installation operation in response to an increase or decrease in the number of connected devices. However, conventional software managing methods fail to take into consideration the complexity of license management in a case where a software installation operation needs to be performed on a large number of devices.

The relationship between a product key supplied by a vendor and an issued license is complex. This relationship varies depending on the terms of use (such as a contract) agreed upon between the vendor and the user. The relationship is not a simple one in which one license is issued for one product key allocated to the supplied software. For example, when a user desires to utilize (run) the supplied software on a large number of image processing apparatuses, the terms of use may permit the issuance of plural licenses for one product key.

Thus, when a device managing apparatus is used for software management, care must be taken not to generate a lack of or excess in the number of licenses for a product key. On the other hand, if a device managing operation is done manually, the burden on the administrator may be too great, possibly resulting in human errors and a failure in the normal functioning of the image processing apparatuses.

SUMMARY OF THE INVENTION

The disadvantages of the prior art may be overcome by the present invention which, in one aspect, is a device managing apparatus for managing software installed in at least one device. The device managing apparatus includes a determination unit configured to determine whether a software item to be installed in a device requires license validation; a validation unit configured to perform license validation on the software item for which the determination unit determines that license validation is required, depending on an available license for the software item; and a setting unit configured to set a license issued by the validation unit in the device in which the software item is installed.

In another aspect, the invention provides a device managing system including a device managing apparatus configured to manage software installed in at least one device, and a license validation unit configured to perform license validation on a software item to be installed in the device. The device managing apparatus and the license validation unit are connected via a data transmission path. The device managing system further includes a determination unit configured to determine whether the software item to be installed in the device requires license validation; an available license number acquiring unit configured to acquire from the license validation unit the number of available licenses for the software item determined by the determination unit to require license validation; a validation request unit configured to request the license validation unit to perform license validation on the software item, depending on the number of available licenses acquired by the available license number acquiring unit; and a setting unit configured to set a license acquired from the license validation unit as a validation result in the device in which the software item is to be installed.

In yet another aspect, the invention provides a computer-readable medium storing a software management program. The program instructs a microprocessor of a device managing apparatus for managing software installed in at least one device to perform the steps of determining whether a software item to be installed in the device requires license validation; performing license validation on the software item that is determined by the determining step to require license validation, depending on an available license for the software item; and setting a license issued by the step of performing license validation in the device in which the software item is installed.

BRIEF DESCRIPTION OF THE DRAWINGS

A complete understanding of the present invention may be obtained by reference to the accompanying drawings, when considered in conjunction with the subsequent, detailed description, in which:

FIG. 3 illustrates a hardware structure of an image processing apparatus in the device managing system illustrated in FIG. 1;

FIG. 4A illustrates a first example of a software management operation;

FIG. 7 illustrates an example of license managing information according to an embodiment of the present invention;

FIG. 8 illustrates an example of device managing information according to an embodiment of the present invention;

FIG. 9 illustrates an example of software managing information according to an embodiment of the present invention;

FIG. 13A illustrates a new image processing apparatus about to be connected to a device managing system; and FIG. 13B illustrates the transmission of a connection notice from the new image processing apparatus to a device managing apparatus.

DETAILED DESCRIPTION OF THE PREFERRED EMBODIMENTS

Embodiment 1

System Structure

Figure 1:
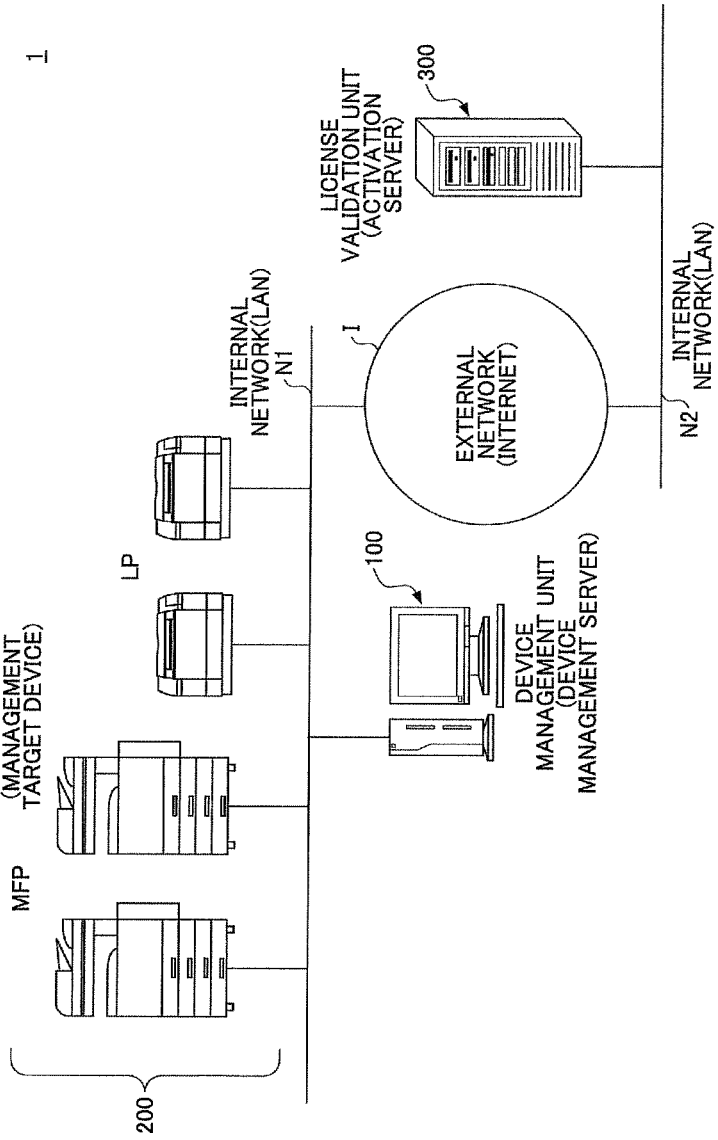
FIG. 1 illustrates a device managing system according to an embodiment of the present invention.

FIG. 1 illustrates a structure of a device managing system 1 according to an embodiment of the present invention. The device managing system 1 includes a device managing apparatus (device managing server) 100 and one or more image processing apparatuses (management target devices) 200. The device managing apparatus 100 and the image processing apparatuses 200 are connected via an internal network N1, such as a local area network (LAN). The one or more image processing apparatuses 200 may include a MFP or a laser printer (LP). The internal network N1 is connected to another internal network N2 set up on the software manufacturer (vendor) end via an external network I, such as the Internet. A license validation unit (activation server) 300 is connected to the internal network N2.

In this system, the device managing apparatus 100 performs device management by acquiring device information from the image processing apparatuses 200 and monitoring their device status. The device managing apparatus 100 manages various software items that run on the image processing apparatus 200 by sending a license validation request to the license validation unit 300.

A hardware structure of the device managing apparatus 100 and the image processing apparatus 200 is described below.

Device Managing Apparatus

Figure 2:
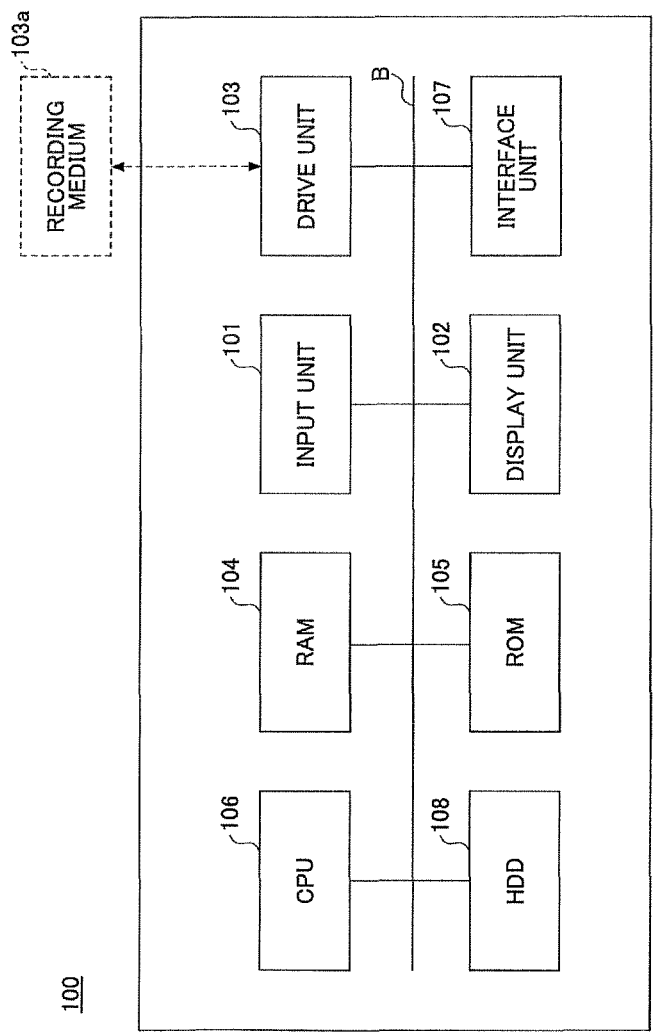
FIG. 2 illustrates a hardware structure of a device managing apparatus in the device managing system illustrated in FIG. 1.

FIG. 2 illustrates a hardware structure of the device managing apparatus 100. As illustrated in FIG. 2, the device managing apparatus 100 includes an input unit 101, a display unit 102, a drive unit 103, a random access memory (RAM) 104, a read only memory (ROM) 105, a central processing unit (CPU) 106, an interface unit 107, and a hard disk drive (HDD) 108. These units are mutually connected via a bus B.

The input unit 101, which may include a keyboard and mouse, is used for entering various operating signals into the device managing apparatus 100. The display unit 102 is configured to display a result such as device information or software managing information) of a process performed by the device managing apparatus 100.

The interface unit 107 provides an interface for connecting the device managing apparatus 100 with a data transmission path, such as a network. Thus, the device managing apparatus 100 can perform data communications with the image processing apparatus 200 and the license validation unit 300 via the interface unit 107.

The HDD 108 is a nonvolatile storage unit in which various programs and data may be stored. The stored programs may include a basic software program that provides an operating system (OS) (such as Windows or UNIX) for overall control of the device managing apparatus 100, and an application program that provides various functions in the information processing system (such as a device managing function or a software management function). The HDD 108 may be configured to manage the stored programs or data using a file system or a database (DB).

The drive unit 103 provides an interface with a detachable recording medium 103a. Thus, the device managing apparatus 100 can read from or write to the recording medium 103a via the drive unit 103. The ROM 105 may include a nonvolatile semiconductor memory (storage unit) capable of retaining internal data even after power is turned off. The ROM 105 may store various data, such as data for a basic input/output system (BIOS) that is executed upon booting of the device managing apparatus 100, system setting data for the device managing apparatus 100, and network setting data.

The RAM 104 may include a volatile semiconductor memory (storage unit) for temporarily storing the programs or data read from the various storage units. The CPU 106 may be configured to control the device managing apparatus 100 generally or cause it to perform the various functions implemented by executing a program that has been read into the RAM 104.

In this hardware structure, the device managing apparatus 100 may be configured to read a program for realizing a device managing function (which may include a software management function) from the HOD 108 into the RAM 104. Then, the device managing apparatus 100 may cause the CPU 106 to execute the program in order to perform software management which may include monitoring the status of the management target device 200 and license validation.

Image Processing Apparatus

FIG. 3 is a block diagram of a hardware structure of the image processing apparatus 200, which is an MFP in the present embodiment. The image processing apparatus 200 includes a controller 210, an operating panel 220, a plotter 230, and a scanner 240, which are mutually connected via a bus B. The operating panel 220, which may include a display portion and an input portion such as a touch panel, is configured to provide various information items, such as device information, to a user, and also to receive various user inputs for an operation setting or an instruction for an operation, for example. The plotter 230 may include an image forming unit configured to form an output image on a sheet of recording medium by electrophotography or inkjet technology, for example. The scanner 240 is configured to optically read a manuscript to form an image.

The controller 210 includes a CPU 211, a storage unit 212, a network I/F 213, and an external storage I/F 214, which are mutually connected via the bus B. The CPU 211 may be configured to realize the various functions of the apparatus or control the apparatus as a whole by executing a program. The storage unit 212 may be configured to store the program and various data, such as image data. For example, the storage unit 212 includes a RAM, a ROM, and a HDD. The RAM may provide a work area for the CPU 211 (i.e., a memory area where a program or data are temporarily read out). The ROM or the HDD may be used for storing a program or various data. Thus, in the image processing apparatus 200, the CPU 211 may read a program stored in the ROM and load the program into the RAM to execute the program.

The network I/F 213 provides an interface for connecting the image processing apparatus 200 with a data transmission path such as a network. The external storage I/F 214 provides an interface for connecting an external storage unit such as a recording medium 214a. Other examples of the external storage unit may include an SD Memory Card and a USB (Universal Serial Bus) memory. Thus, the image processing apparatus 200 can write or read a program or data into or from the recording medium 214a via the external storage I/F 214.

The image processing apparatus 200 having the above-described hardware structure may be configured to realize an image forming function by which print data received from a PC (personal computer) is converted into a raster image (bitmap image) using an image forming program running on the controller 210, and then a toner image is formed on a sheet of recording medium by the plotter 230.

Software Management Function

A software management function of the device managing apparatus 100 according to the present embodiment is generally performed as follows. First, it is determined whether license validation is required for software that is desired to be installed (which may be hereafter referred to as "installation target software"). For this determination, the device managing apparatus 100 acquires information of the number of available (remaining) licenses from managing information about issued licenses that is retained in the license validation unit 300, based on a product key of the software needing license validation. Based on the acquired information about the number of available licenses, the device managing apparatus 100 sends a license validation request to the license validation unit 300. The device managing apparatus 100 then sets an issued license (license code) contained in a response from the license validation unit 300 in the image processing apparatus 200 (management target device) needing software update.

Figure 4B:
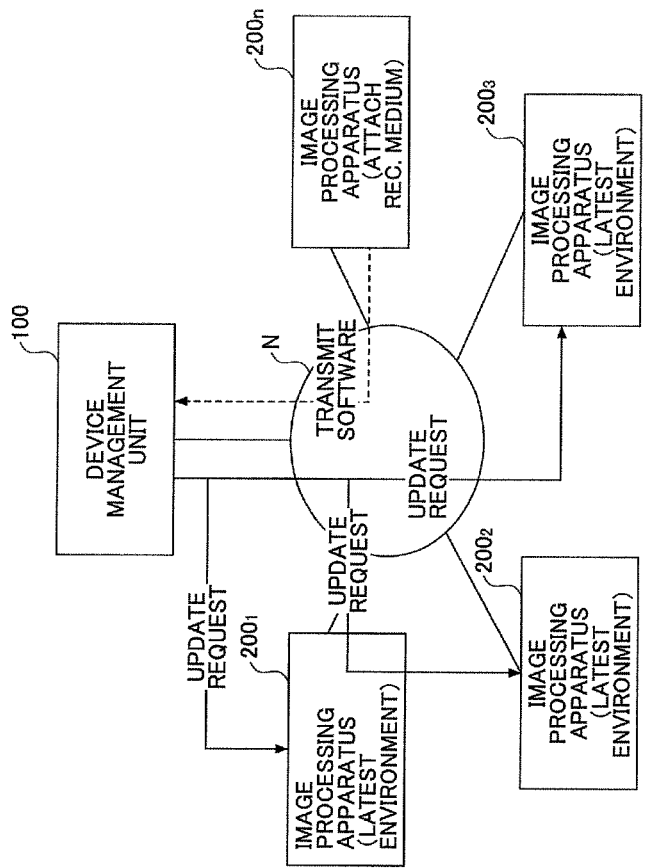
FIG. 4B illustrates a second example of the software management operation.

Next, a software management operation performed on a plurality of the image processing apparatuses 200 according to an embodiment of the present invention is described with reference to FIGS. 4A and 4B. Referring to FIG. 4A, the recording medium 219a storing a latest (most recent) software program as installation target software is loaded into an image processing apparatus $200_n$ connected to the device managing system 1. The latest software program is transmitted from the image processing apparatus $200_n$ to the device managing apparatus 100, as illustrated in FIG. 4B. Then, the device managing apparatus 100 transmits the received program to the other image processing apparatuses $200_1$ through $200_3$, thus requesting an updating of their software environments. Thus, the software environments of the image processing apparatuses $200_1$ through $200_n$ are updated to the latest environment. The plural image processing apparatuses $200_1$ through $200_n$ may be hereafter collectively referred to as the "image processing apparatus 200".

Thus, in accordance with the present embodiment, software management is actively performed by the image processing apparatus 200. Specifically, upon software updating in the image processing apparatus $200_n$ among the plural image processing apparatuses $200_1$ through $200_n$ in the device managing system 1, software updating is dynamically performed in the other image processing apparatuses $200_1$ through $200_3$. Thus, the burden of software updating operation on service personnel from the manufacturer or an administrator of the user environment, for example, can be reduced.

When the device managing apparatus 100 performs software management in the above-described software management environment, it must be ensured that no lack or excess of licenses for a software product key arises. For this purpose, in the device managing system 1, the device managing apparatus 100 performs license management of the image processing apparatus 200 in which license validation (issuing of license) is dynamically performed depending on the number of available licenses among the total number of licenses of which issuance is allowed under the terms of use. In other words, in the device managing system 1, instead of performing a license management operation manually on the device managing apparatus 100 via a GUI (graphical user interface), a license management operation is dynamically performed in synchronization with an update of the software environment of the image processing apparatus 200. Thus, the device managing system 1 can perform a license management operation automatically in the environment in which software on plural devices is managed.

Next, a functional configuration of the various units of the device managing system 1 for realizing the software management function is described. First, the functions of peripheral units including the license validation unit 300 and the image processing apparatus 200 are briefly described.

Image Processing Apparatus

Figure 5:
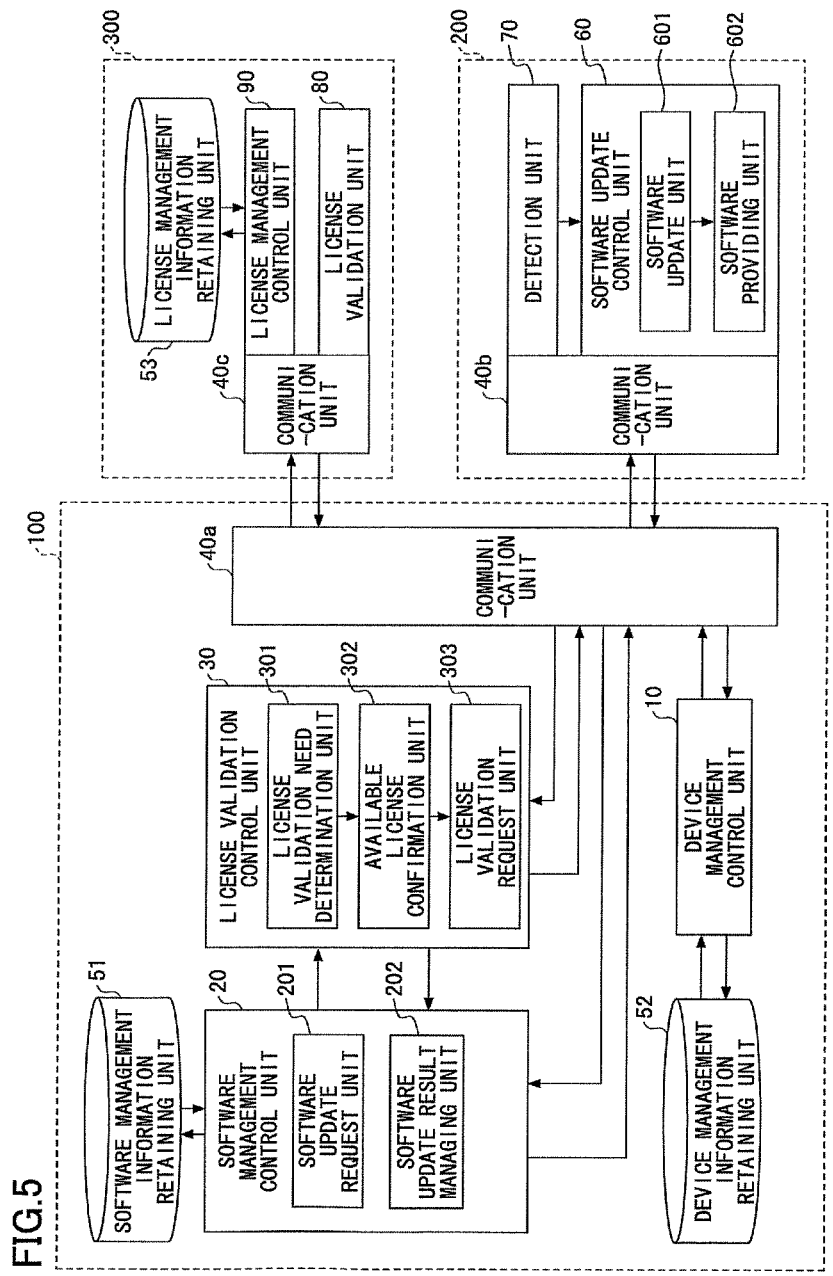
FIG. 5 is a block diagram of a software structure for realizing a software management function according to an embodiment of the present invention.

As illustrated in FIG. 5, the image processing apparatus 200 includes a communication unit 40b, a software update control unit 60, and a detecting unit 70. The communication unit 40b is a functional unit configured to perform data communications between the image processing apparatus 200 and other devices connected via a data transmission path.

The detecting unit 70 provides a functional unit configured to detect connection of an external unit, such as the recording medium 214a (external storage), to the image processing apparatus 200. Upon detection of the recording medium 214a, the detecting unit 70 notifies the software update control unit 60, as will be described in detail later.

The software update control unit 60 provides a functional unit for controlling the updating (such as installation of software) of the software environment of the image processing apparatus 200. The software update control unit 60 includes a software update unit 601 and a software providing unit 602. The software update unit 601 may be configured to install a latest software program in the image processing apparatus 200 and to update its software environment. The latest software program installed by the software update unit 601 may be received from the device managing apparatus 100 via the communication unit 40b. Alternatively, the latest software program may be acquired from the recording medium 214a. For example, upon notification from the detecting unit 70, the software update unit 601 accesses the recording medium 214a attached to the image processing apparatus 200, and acquires the program retained in the recording medium 214a.

Figures 6A, 6B:
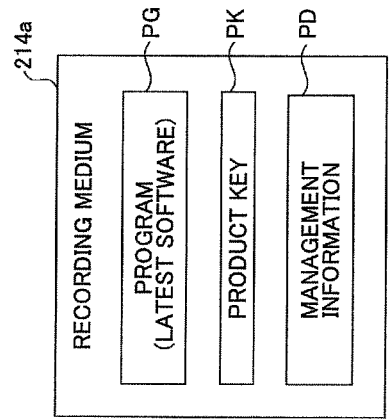
FIG. 6A illustrates an example of data stored in a recording medium according to an embodiment of the present invention.
FIG. 6B illustrates an example of managing information stored in the recording medium illustrated in FIG. 6A.

FIGS. 6A and 6B illustrate examples of data retained in the recording medium 214a. In the example illustrated in FIG. 6A, the recording medium 214a stores a latest software program PG that can be run on the image processing apparatus 200, a product key PK allocated to the latest software, and managing information PD of the product key PK. These data items are retained in predetermined storages areas of the recording medium 214a.

FIG. 6B illustrates the managing information PD in which information items of "Product ID" and "Product Key ID" are associated with each other for each product. The "product" herein refers to a unit of software supplied by a manufacturer under the terms of use. The "Product ID" refers to data identifying the product, such as the name of a software product. The "Product Key ID" refers to data identifying the product key.

The above-described data structure of the managing information PD makes it possible to identify the Product ID information of a corresponding program PG based on the product key PK. The information items of the managing information PD may be updated (by addition, for example) when the program PG and the product key PK are stored in the recording medium 214a.

The software update unit 601 acquires the product key PK and the product ID information as well as the program PG by accessing the recording medium 214a. The software update unit 601 then installs the acquired program PG in the information processing apparatus 200. The software providing unit 602 transmits the software installed in the information processing apparatus 200, such as the image processing apparatus $200_n$, to the device managing apparatus 100. Specifically, the software providing unit 602 transmits the program installed in the information processing apparatus $200_n$ to the device managing apparatus 100 via the communication unit 40b. The transmission of the latest software program from the software providing unit 602 to the device managing apparatus 100 also indicates a request for software updating in the other image processing apparatuses, such as the image processing apparatuses $200_1$ through $200_3$. At this time, the software providing unit 602 transmits not only the program PG but also the product key PK.

Thus, the image processing apparatus $200_n$, for example, supplies the latest software installed in it to the device managing apparatus 100, which carries out software management of all of the management target devices including the other image processing apparatuses $200_1$ through $200_3$. In this way, the image processing apparatus 200 is configured to update its software environment and supply the latest software.

License Validation Unit

The license validation unit 300 includes a communication unit 40c, a license validation unit 80, a license management control unit 90, and an information retaining unit 53. The license validation unit 300 performs license validation and license management as described below.

The communication unit 40c provides a functional unit for performing two-way data communications between the license validation unit 300 and other devices connected via a data transmission path. The license validation unit 80 provides a functional unit for performing a license validation process. Specifically, the license validation unit 80, in response to a license validation request from the device managing apparatus 100, performs validation based on the device information and the product key PK that are received at the time of the request. When granting (validating) the utilization of designated software, the license validation unit 80 generates a license code based on the device information and the product key PK, and transmits the license code to the device managing apparatus 100 as an validation result.

The license management control unit 90 provides a functional unit for controlling license management of a licensed product by using license managing information 53D illustrated in FIG. 7, for example. In the illustrated example, the license managing information 53D includes information items of "Product ID", "Registered Product Key ID", "Total No. of Issue-Granted Licenses", "Issued License Key ID", and "No. of Available Licenses" which are associated with one another for each product.

The "Registered Product Key ID" refers to data identifying the product key PK that is allocated to software under the terms of use and that is already registered. The "Total No. of Issue-Granted Licenses" refers to the total number of licenses of which issuance is granted under the terms of use. The "Issued License Key ID" refers to data identifying a license code generated upon license validation. The "No. of Available Licenses" indicates the number of licenses in the Total No. of Issue-Granted Licenses that are available for issuance.

The license managing information 53D is retained by the license managing information retaining unit 53. The license managing information retaining unit 53 may be provided by a storage area in a HDD not shown) of the license validation unit 300. The above-described data structure of the license managing information 53D allows the number of available licenses to be identified based on the product ID information and/or the product key PK. The information items of the license managing information 53D may be updated (by addition or deletion, for example) by the license management control unit 90 upon entry into new terms of use or a change in the existing terms of use, or license validation. Such an updating operation may be carried out on the manufacturer end.

The information items "Issued License Key ID" and "No. of Available Licenses" of the license managing information 53D may be updated upon generation of a license code by the license validation unit 80. For example, data identifying the generated license code is added to the information item "Issued License Key ID", and the value of the information item "No. of Available Licenses" is decreased upon generation of the license code.

The license management control unit 90, in response to a request from the device managing apparatus 100 for the number of available licenses, determines the number of available licenses based on the product ID information and/or the product key PK that are designated at the time of the request, and then sends a response to the requesting apparatus via the communication unit 40c.

Device Managing Apparatus

As illustrated in FIG. 5, the device managing apparatus 100 includes a device management control unit 10, a software management control unit 20, a license validation control unit 30, a communication unit 40a, and information retaining units 51 and 52. The communication unit 40a provides a functional unit for performing two-way communications between the device managing apparatus 100 and other apparatuses connected by a data transmission path via the interface unit 107. For example, the communication unit 40a transmits or receives various data, such as a software update request from the image processing apparatus 200, a validation request to the license validation unit 300, and a request for the number of available licenses to the license validation unit 300.

The device management control unit 10 provides a functional unit for controlling device management of the image processing apparatus 200 as a management target device. For example, the device management control unit 10 collects device information from the image processing apparatus 200 via the communication unit 40a in order to manage the image processing apparatus 200 using device managing information 52D illustrated in FIG. 8, for example.

FIG. 8 illustrates an example of the device managing information 52D. The device managing information 52D includes the information items of "Device ID", "IP Address", "MAC Address", "Type ID", and "Function" which are associated with one another for each image processing apparatus 200 (management target device). The "Device ID" refers to data identifying the management target device, such as a device ID (serial number). The "IP Address" indicates an IP (Internet Protocol) address allocated to the image processing apparatus 200. The "MAC (Media Access Control) Address" indicates a physical address allocated to the network I/F 213 (uniquely, in principle). The "Type ID" identifies the type of the image processing apparatus 200. The "Function" indicates the various functions (services realized by the execution of software) that the image processing apparatus 200 is capable of providing.

The device managing information 52D is retained in the device managing information retaining unit 52. The device managing information retaining unit 52 may correspond to a memory area in the HDD 108 of the device managing apparatus 100. Such a data structure of the device managing information 52D makes it possible to identify the IP address or a function of the image processing apparatus 200 based on the various items of device identifying information. The information items of the device managing information 52D may be updated (by addition or deletion, for example) by the device management control unit 10 at the time of newly introducing or removing the image processing apparatus 200.

The device management control unit 10 may be configured to acquire a MIB (Management Information Base) from the image processing apparatus 200 using SMTP (Simple Mail Transfer Protocol). The device management control unit 10 then updates the information items of the device managing information 52D based on the acquired MIB.

In the device managing apparatus 100, the software management control unit 20, based on the device managing information 52D, performs a software update operation (including transmission of an installation program and an installation request) and the like on the image processing apparatus 200 as a management target device, as described below. The software management control unit 20 provides a functional unit for controlling processes relating to software management. For example, the software management control unit 20 performs software management using software managing information 510 illustrated in FIG. 9.

FIG. 9 illustrates an example of the software managing information 51D. The software managing information 51D according to the illustrated example includes information items of "Product ID", "Latest Version", "Version Requiring License Validation", "Compatible Type", and "Software Update Result", which are associated with each product. The "Latest Version" indicates the latest version of software. The "Version Requiring License Validation" indicates a version that requires license validation in order to make software usable (or valid). The "Compatible Type" indicates a type of image processing apparatus 200 on which software can function (or run). The "Software Update Result" indicates a result of updating software.

The software managing information 51D is retained in the software managing information retaining unit 51, which may correspond to a memory area in the HDD 108 of the device managing apparatus 100. The above-described structure of the software managing information 51D makes it possible to identify the latest version, a version that requires license validation, and a compatible type of software installed in the image processing apparatus 200 based on the Product ID information and/or product key PK. The information items of the software managing information 51D may be updated by the software management control unit 20 at the time of reception of the latest software from the image processing apparatus 200.

The software management control unit 20 includes a software update request unit 201 and a software update result managing unit 202. The software update request unit 201 transmits a program PG via the communication unit 40a and requests one or more other image processing apparatuses 200 to update their software environments (by installing the latest software). For example, the software update request unit 201 receives a software update request from the image processing apparatus 200, in which the latest software has been installed, requesting software updating in the other image processing apparatuses $200_1$ through $200_3$. Thus, the software update request unit 201 transmits the program PG to the other image processing apparatuses $200_1$ through $200_3$ as update targets. The program PG thus transmitted is the latest software program PG transmitted by the software providing unit 602 of the image processing apparatus 200 in which the latest software has been installed.

The software update result managing unit 202 manages a software update result returned from the image processing apparatus 200 in response to the software update request. The software update result managing unit 202 may be configured to record the software update result in the software managing information retaining unit 51. For example, the software update result managing unit 202, by referring to the software managing information 510, stores the response data under the information item "Software Update Result" based on the product ID information and/or the product key PK. The software update result managing unit 202 may also be configured to request the image processing apparatus 200 that made the software update request to notify a user about the status of software updating based on the response data. Such a software update status notification may be displayed on the operating panel 220 of the image processing apparatus 200. The status notification may be displayed on the image processing apparatus 200 rather than the device managing apparatus 100 when a person carrying out the software update operation (such as maintenance personnel from a manufacturer or an administrator of the user environment) is facing the image processing apparatus 200.

The software update result managing unit 202 determines whether software updating has been performed in all of the image processing apparatuses 200 as the update targets. When the result of such determination is positive, the image processing apparatus 200 is notified of an operation result. The license validation control unit 30 provides a functional unit for controlling processes relating to license validation. The license validation control unit 30 includes a license validation need determination unit 301, an available license confirmation unit 302, and a license validation request unit 303.

The license validation need determination unit 301 determines whether the software (program PG) that is transmitted to the image processing apparatus 200 for installation requires license validation (activation). For example, the license validation need determination unit 301, based on the product ID information and/or the product key PK, identifies the version requiring license validation by referring to the software managing information 51D. The license validation need determination unit 301 then compares the identified version with the to-be-installed version in order to determine whether the software requires license validation. For example, when the identified version corresponds to the to-be-installed version, or when the to-be-installed version is newer than the identified version, the license validation need determination unit 301 may determine that license validation is required. On the other hand, when the to-be-installed version is older than the identified version, it may be determined that no license validation is required.

For example, a case is considered where version 2.0 of software A is installed in MFP01. In this case, based on the software managing information 51D illustrated in FIG. 9, the license validation need determination unit 301 determines that license validation is required in order to make software A usable after installation. When version 1.3 of software C is installed in MFP05, the license validation need determination unit 301 determines that no license validation is required.

The available license confirmation unit 302 confirms the number of available licenses in the total No. of issue-granted licenses under the terms of use. The number of available licenses is confirmed for determining whether a license validation request can be issued because when the number of available licenses is "0", a license validation request would result in no validation. Specifically, the available license confirmation unit 302 requests the number of available licenses by transmitting, via the communication unit 40a, the product ID information and/or the product key PK of the software that requires license validation to the license validation unit 300. In response, the license validation unit 300, based on the received product ID information and/or the product key PK, identifies the number of available licenses by referring to the license managing information 53D. Then, the available license confirmation unit 302 receives the number of available licenses in the form of a response from the license validation unit 300.

Based on the number of available licenses acquired by the above method, the available license confirmation unit 302 controls a license validation request as described below. When it is confirmed that there is at least one available license (i.e., the number of available licenses is one or more), the available license confirmation unit 302 instructs the image processing apparatus 200 to request license validation after the software is installed. On the other hand, when it is confirmed that there is no available license (i.e., the number of available licenses is zero), the available license confirmation unit 302 requests the image processing apparatus 200 that made the software update to notify a user about the lack of license that can be issued based on the confirmation result. Such a notice may be displayed on the operating panel 220 as mentioned above.

The license validation request unit 303 sends a software license validation (activation) request to the license validation unit 300, and transmits a returned validation result to the image processing apparatus 200. For example, the license validation request unit 303, as described above, requests license validation based on the result of determination by the software validation need determination unit 301 and the result of confirmation by the available license confirmation unit 302. Specifically, the license validation request unit 303 may request license validation when the software to be installed in the image processing apparatus 200 requires license validation and the number of available licenses is one or more.

The license validation request unit 303 acquires a license code as an validation result by transmitting, via the communication unit 40a, the device information and the product key Ph to the license validation unit 300. The device information is acquired from the device managing information 52D via the device management control unit 10 based on the device identifying information.

Thus, the software management function according to the present embodiment is realized by the cooperative operation of the above-described various functional units. Next, the software management function (cooperative operation of the functional units) is described in detail with reference to sequence diagrams. The software management function is realized mainly by a CPU reading programs (software management programs) installed in the device managing apparatus 100, the image processing apparatus 200, and the license validation unit 300 out of a storage location (such as a ROM or HDD) into a RAM in order to execute the following processes.

In the following description, the software management function is described with reference to Processes 1 and 2. Process 1 involves software management of an image processing apparatus to which a recording medium is attached. Process 2 involves software management of another image processing apparatus. Further, in the following description, the image processing apparatus 200 to which the recording medium 214a is attached is the image processing apparatus $200_n$, while the other image processing apparatuses 200 as management target devices are the image processing apparatuses $200_1$ through $200_3$. Namely, the image processing apparatus $200_n$ is the device that sends a software update request to the other image processing apparatuses $200_1$ to $200_3$ via the device managing apparatus 100, and the other image processing apparatuses $200_1$ to $200_3$ are the update target devices.

Process 1

Figure 10:
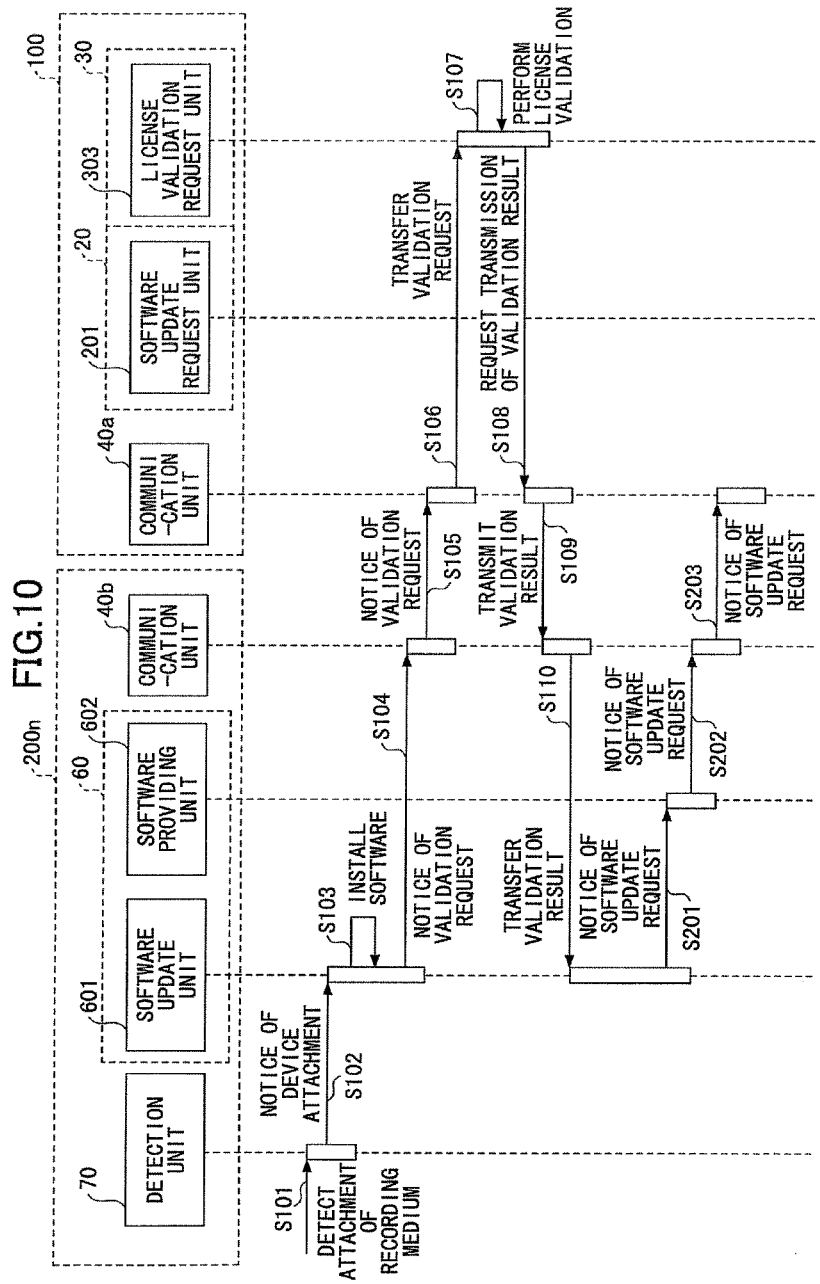
FIG. 10 is a sequence diagram of a first software management process sequence.

FIG. 10 is a sequence diagram of a first software management process sequence according to an embodiment. First, the image processing apparatus $200_n$ detects the attachment of the recording medium 214a to the external storage I/F 214 via the detecting unit 70 (step S101). The detecting unit 70 notifies the software update unit 601 of the software update control unit 60 that the recording medium 214a has been attached to the information processing apparatus 200 (step S102).

In response to the attachment detection notice, the software update unit 601 installs the latest software program PG acquired from the recording medium 214a in the information processing apparatus $200_n$ (step S103). At this time the software update unit 601 may determine whether license validation is required for the installation target software. In this case, the software update unit 601 may request license validation only when it is determined that license validation is required.

The software update unit 601 requests the communication unit 40b to send a license validation request for the software installed in the information processing apparatus $200_n$ (step S104). In response, the communication unit 40b sends a license validation request to the device managing apparatus 100 (step S105). For example, the notifying unit 40b then transmits the device information of the information processing apparatus 200n and the product key PK of the installed software that are received from the software update unit 601 to the device managing apparatus 100. The transmitted information may include device network information, such as an IP address that can be obtained from the device managing information 52D, device identifying information such as a serial number, and type ID information, such as a model name.

The device managing apparatus 100 transfers the license validation request notification received via the communication unit 40a from the image processing apparatus $200_n$ to the license validation request unit 303 of the license validation control unit 30 (step S106). At this time, the license validation request unit 303 is supplied with the device information and the product key PK that have been received as the license validation request notification.

The license validation request unit 303 sends a validation request to the license validation unit 300 in accordance with the validation request (step S107). For example, the license validation request unit 303 transmits the device information and the product key PK to the license validation unit 300 via the communication unit 40a, thus requesting a validation process. As a result, a validation process is performed by the license validation unit 80 in the license validation unit 300. Upon successful validation, a license code is generated based on the device information and the product key PK.

The license validation request unit 303 requests the communication unit 40a to transmit the validation result (license code) sent from the license validation unit 300 (step S108). In response, the communication unit 40a transmits the validation result (license code) to the image processing apparatus 200n that made the license validation request (step S109). Then, the image processing apparatus 200n transfers the validation result received by the communication unit 40b from the device managing apparatus 100 to the software update unit 601 (step S110). Thereafter, the software update unit 601 sends a software update request to the software providing unit 602 of the software update control unit 60 in order to update the other image processing apparatuses $200_1$ to $200_3$ as update target devices (step S201).

In accordance with the update request, the software providing unit 602 requests the communication unit 40b to send a software update request to the update target devices $200_1$ to $200_3$ (step S202). As a result, the communication unit 40b sends a software update request to the device managing apparatus 100 (step S203). Specifically, the notifying unit 40b transmits the product ID information and the product key PK of the supplied software as well as the program PG received from the software providing unit 602, to the device managing apparatus 100, thus sending an update request. The product ID information, the product key PK, and the program PG may be acquired from the recording medium 214a upon its installation on the information processing apparatus $200_n$.

Thus, in the device managing system 1, when the latest software is installed in the image processing apparatus $200_n$ as a management target device, a request for installing the latest software is sent to the other update target devices $200_1$ to $200_3$ via the device managing apparatus 100. Namely, in the device managing system 1, the device managing apparatus 100 actively performs a software update process on the image processing apparatus 200 as a management target device.

Process 2

Figure 11:
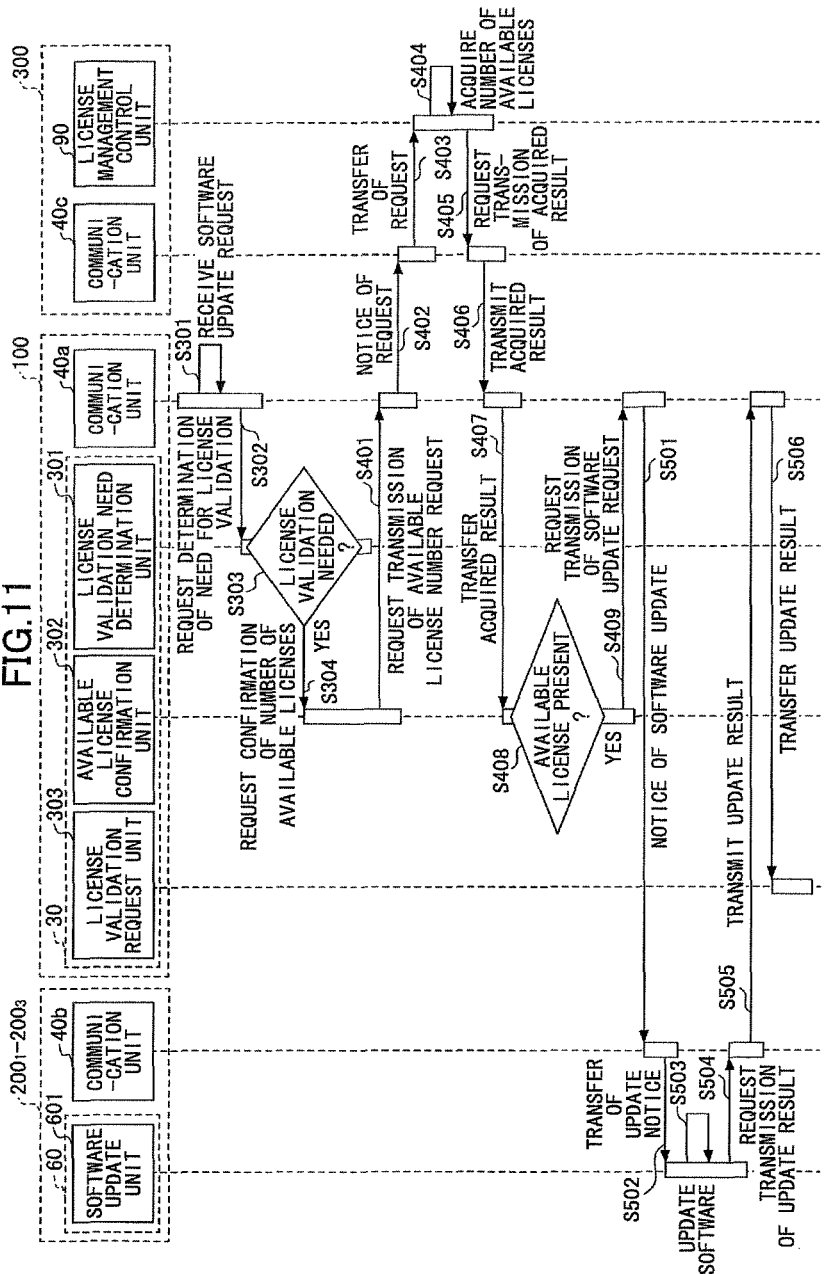
FIG. 11 is a sequence diagram of a second software management process sequence.
Figure 12:
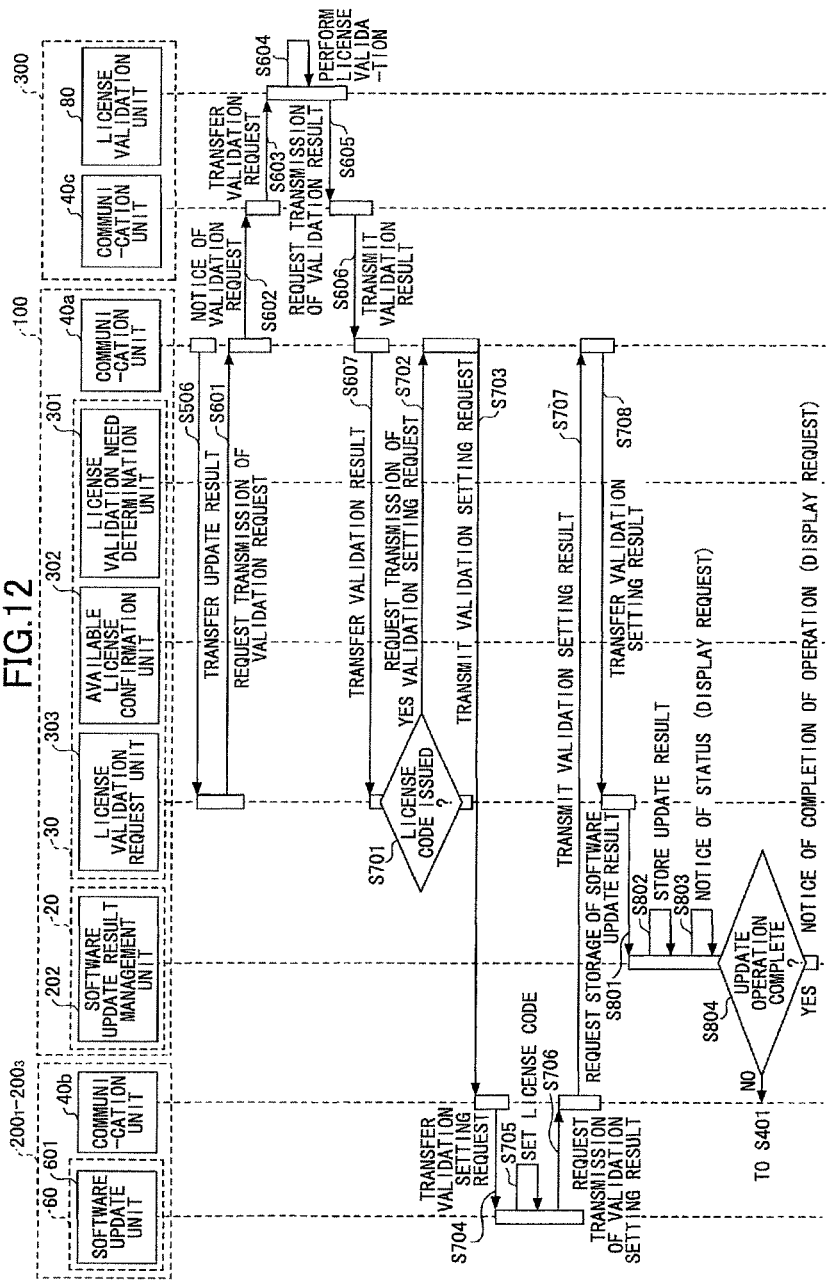
FIG. 12 is a sequence diagram of a third software management process sequence.

FIGS. 11 and 12 illustrate a second and a third example, respectively, of the software management process sequence according to the present embodiment. Referring to FIG. 11, the device managing apparatus 100 receives a software update request notification from the image processing apparatus 200n via the communication unit 40a (step S301).

The device managing apparatus 100 requests the license validation need determination unit 301 of the license validation control unit 30 to determine whether the received software update requires license validation (step S302). At this time, the license validation need determination unit 301 is supplied with the product ID information and/or the product key PK of the installation target software.

In accordance with the license validation need determination request, the license validation need determination unit 301 determines whether the installation target software requires license validation (step S303). Specifically, the license validation need determination unit 301 accesses the software managing information retaining unit 51 and, based on the product ID information and/or the product key PK, refers to the software managing information 51D. Then, the license validation need determination unit 301 acquires relevant data for the information item "Version Requiring License Validation" from the software managing information 51D. The license validation need determination unit 301 then compares the data (value of version) with the value of the installed version in order to determine the need of license validation.

When it is determined that no license validation is required for the installation target software ("NO" in step S303), the license validation need determination unit 301 transmits, via the communication unit 40a, the product key PK and the program PG of the installation target software to the update target devices $200_1$ to $200_3$, thus requesting software update.

On the other hand, when it is determined that license validation is required ("YES" in step S303), the license validation need determination unit 301 requests data of the number of licenses that are currently available from the available license confirmation unit 302 of the license validation control unit 30 (step S304). At this time, the available license confirmation unit 302 is supplied with the product ID information and/or the product key PK.

In response, the available license confirmation unit 302 requests the communication unit 40a to send a request for the number of available licenses for the installation target software (step S401). As a result, the communication unit 40a notifies the license validation unit 300 about a request for the number of available licenses (step S402). Specifically, the communication unit 40a transmits the product ID information and/or the product key PK of the installation target software that are received from the available license confirmation unit 302 to the license validation unit 300.

The license validation unit 300 then transfers the request notification to the license management control unit 90 (step S403). At this time, the license management control unit 90 is supplied with the product ID information and/or the product key PK that have been received as the request notification for acquiring the number of available licenses.

In accordance with the acquisition request, the license management control unit 90 acquires the number of available licenses for the installation target software (step S404). Specifically, the license management control unit 90 accesses the license managing information retaining unit 53 and, based on the product ID information and/or the product key PK, acquires relevant data of the information item "No. of Available Licenses" from the license managing information 53D.

The license management control unit 90 then requests the communication unit 40c to transmit a result of acquisition (the number of available licenses) (step S405). As a result, the communication unit 40c transmits the acquired result to the device managing apparatus 100 (step S406). Thus, the number of available licenses of the installation target software is transmitted to the device managing apparatus 100 that made the request for the number.

The device managing apparatus 100 then transfers the acquired result to the available license confirmation unit 302 (step S407).

The available license confirmation unit 302, based on the acquired result, determines whether there is an available license for the installation target software (step S408). Namely, the available license confirmation unit 302 determines whether software update can be performed in the update target devices $200_1$ through $200_1$ based on the acquired number of available licenses.

When it is determined that there is no available license of the installation target software ("NO" in step S408), the available license confirmation unit 302 requests the image processing apparatus $200_n$ that made the software update request to issue a notice of the lack of the number of issue-granted licenses based on the confirmed result. As a result, the image processing apparatus 200, displays a message on a screen of the operating panel 220, for example, to the effect that the number of issue-granted licenses is insufficient.

On the other hand, when it is determined that there is a sufficient number of available licenses ("YES" in step S408), the available license confirmation unit 302 requests the communication unit 40a to send a software update request to the update target device 200 (step S909). In response, the communication unit 90a sends a software update request to the update target devices $200_1$ to $200_3$ (step S501). Thus, the communication unit 40a transmits the program PG of the installation target software corresponding to the update request received in step S301 to the update target devices $200_1$ to $200_3$, thus notifying them of the update request.

The update target devices $200_1$ to $200_3$ transfer the software update request notification to the software update unit 601 of the software update control unit 60 (step S502). At this time, the software update unit 601 is supplied with the program PG that has been received as the software update request notification.

The software update unit 601 then installs the received program PG and performs a software update process (step S503). Then, the software update unit 601 of the update target devices $200_1$ to $200_3$ returns an update result. Specifically, the software update unit 601 requests the communication unit 40b to transmit the update result (step S504). In response, the communication unit 40b transmits the update result to the device managing apparatus 100 that made the update request (step S505).

The device managing apparatus 100 then transfers the update result to the license validation request unit 303 of the license validation control unit 30 (step S506). As illustrated in FIG. 12, the license validation request unit 303 of the device managing apparatus 100 requests the communication unit 40a to send a license validation request notice to the license authentication unit 300 for the software installed in the update target devices $200_1$ to $200_3$ (step S601). In response, the communication unit 40a sends a license validation request to the license validation unit 300 (step S602). Specifically, the communication unit 40a transmits the device information of the update target devices $200_1$ to $200_3$ and the product key PK of the installed software received from the license validation request unit 303 to the license validation unit 300, thus requesting license validation.

The license validation unit 300 transfers the license validation request notification received from the device managing apparatus 100 via the communication unit 40c to the license validation unit 80 (step S603). At this time, the license validation unit 80 is supplied with the device information and the product key PK received with the license validation request notification.

The license validation unit 80, based on the device information and the product key PK, performs a license validation process (step S604). Specifically, the license validation unit 80 generates a license code based on the device information and the product key PK and sends the license code to the requesting source. Thus, the license validation unit 80 issues a license (utilization-granting information) by performing the validation process, and returns the issued license as a validation result.

At this time, the license management control unit 90 accesses the license managing information retaining unit 53 and updates the license managing information 53D. For example, the license management control unit 90 updates the information items "Issued License Key ID" and "No. of Available Licenses" of the license managing information 53D. Specifically, the "Issued License Key ID" is updated by adding the data identifying the generated license code, and the "No. of Available Licenses" is updated by decreasing the number of available licenses.

The license validation unit 80 requests the communication unit 40c to transmit the validation result (license code) received from the license validation unit 300 (step S605). The communication unit 40c transmits the validation result to the device managing apparatus 100 that made the license validation request (step S606). Namely, the license code that is set in the update target devices $200_1$ to $200_3$ is transmitted to the device managing apparatus 100 that made the license validation request. The device managing apparatus 100 then transfers the validation result received from the license validation unit 300 via the communication unit 40a to the license validation request unit 303 (step S607).

Then, the license validation request unit 303 determines whether the license code to be set in the update target devices $200_1$ to $200_3$ has been issued, based on the validation result (step S701). When it is determined that the license code to be set in the update target devices $200_1$ to $200_3$ is not issued ("NO" in step S701), the license validation request unit 303 requests the image processing apparatus 200, that made the software update request to issue a notice of license validation error based on the validation result. As a result, in the image processing apparatus $200_n$, a message is displayed on a screen of the operating panel 220, for example, indicating the license validation error.

On the other hand, when it is determined that a license code has been issued ("YES" in step S701), the license validation request unit 303 requests the communication unit 40a to transmit a notice prompting the setting of license validation (step S702). As a result, the communication unit 40a transmits a license validation setting request notification to the update target devices $200_1$ to $200_3$ (step S703). Specifically, the communication unit 40a transmits the license code corresponding to the validation result received in step S701 to the update target devices $200_1$ to $200_3$. Namely, the license code for making the installed software utilizable is transmitted to the image processing apparatuses $200_1$ to $200_3$ that made the software update.

The update target devices $200_1$ to $200_3$ transfer the license validation setting request notification received from the device managing apparatus 100 via the communication unit 40b to the software update unit 601 of the software update control unit 60 (step S704). At this time, the software update unit 601 is supplied with the license code received as the license validation setting request notification.

The software update unit 601 then sets the license code in association with the software installed at the time of software update (step S705). Specifically, the software update unit 601 stores the license code in a predetermined storage area, and makes a license validation setting for the installation target software. The software update unit 601 then requests the communication unit 40b to transmit a license validation setting result (step S706). The communication unit 40b transmits the license validation setting result to the device managing apparatus 100 that made the license validation request (step S707). Namely, the license code that is set in the update target devices $200_1$ to $200_3$ is transmitted to the device managing apparatus 100 that made the license validation request. The device managing apparatus 100 transfers the license validation result received from the license validation unit 300 via the communication unit 40a to the license validation request unit 303 (step S708).

The license validation request unit 303, upon reception of the license validation setting result, determines that the software update process for the update target devices $200_1$ to $200_3$ has been completed, and then requests the software update result managing unit 202 of the software management control unit 20 to store the update result (step S801). The software update result managing unit 202 then stores the software update result in a predetermined memory area such as in the HDD as log data (step S802).

The software update result managing unit 202 then requests the image processing apparatus $200n$ that made the software update request to issue a notice of the software update result (step S803). As a result, the image processing apparatus 200n displays a message on the screen of the operating panel 220, for example, indicating the software update result. The software update result managing unit 202 determines whether the software update process has been performed on all of the update target devices $200_1$ to $200_3$ (step S804).

When it is determined that the software update process has been performed on all of the update target devices $200_1$ to $200_3$ (and thus the update operation is complete) ("YES" in step S804), the software update result managing unit 202 requests the image processing apparatus $200_n$ that made the software update request to issue a notice indicating the completion of software update. As a result, the image processing apparatus $200_n$ displays a message on the screen of the operating panel 220, for example, indicating the completion of software updating. Alternatively, when the image processing apparatus 200n includes the plotter 230, the notice of completion of software updating may be performed by printing a report instead of, or in addition to, the display on the operating panel 220.

On the other hand, when it is determined that the software update process has not been performed on all of the update target devices $200_1$ through $200_3$ (i.e., the update operation is not complete)("NO" in step S804), the process routine returns to step S401 where the software update result managing unit 202 confirms the number of available licenses, and the subsequent process steps are performed on all of the update target devices $200_1$ through $200_3$.

Thus, in the device managing system 1, in response to a software update request transmitted from the image processing apparatus $200_n$ on which the latest software is installed to the update target devices $200_1$ to $200_3$, the device managing apparatus 100 performs the software installation and license validation processes on the update target devices $200_1$ to $200_3$. Namely, in the device managing system 1, the device managing apparatus 100 performs the software update process including the license management process on the image processing apparatus 200 as a management target device.

In accordance with the present embodiment, the update target devices $200_1$ to $200_3$ may be identified as follows. For example, the device managing apparatus 100 accesses the device managing information retaining unit 52 and refers to the device managing information 525. Then, the device managing apparatus 100 identifies one of the update target devices $200_1$ to $200_3$ whose type corresponds to that of the image processing apparatus $200_n$ that made the software update request as an update target.

The device managing apparatus 100 identifies the update target as described above upon reception of a software update request from the image processing apparatus 200n on which the latest software is installed (step S301 in FIG. 11). Thus, in the device managing apparatus 100, a software update process can be performed in accordance with the number of the update target devices or the number of available licenses. For example, when the number of the update target devices is greater than the number of available licenses, the software update process is performed on as many of the update target devices $200_1$ to $200_3$ as possible, based on the number of available licenses. On the other hand, when the number of the update target devices is smaller than the number of available licenses, the software update process may be performed on all of the update target devices $200_1$ to $200_3$ based on the number of the update target devices. Namely, the device managing apparatus 100 performs license validation (issuing of licenses) dynamically in the software update process depending on the number of available licenses, thus performing license management of the update target devices $200_1$ to $200_3$.

In the device managing apparatus 100, the software update process based on the number of the update target devices or the number of available licenses may be performed on one update target device at a time, or on all of the update target devices at once.

Variation

FIGS. 13A and 13B illustrate a variation of the software management process according to the foregoing embodiment. Referring to FIG. 13A, a new image processing apparatus $200_n$ is connected to the device managing system 1. As a result, in the device managing system 1, the new image processing apparatus 200n transmits a connection notice to the device managing apparatus 100, as illustrated in FIG. 13B. In response, the device managing apparatus 100 updates the software environment of the new image processing apparatus 200n to be identical to the environment of the other image processing apparatuses $200_1$ to $200_3$.

In this variation, the detecting unit 70 of the image processing apparatus 200 has the following function. The detecting unit 70 detects connection of the information processing apparatus 200 to an internal network N (such as a data transmission path) of the device managing system 1 via the network I/F 213. In response, the detecting unit 70 notifies the device managing apparatus 100 via the communication unit 40b that the information processing apparatus 200 has joined the device managing system 1. Specifically, the communication unit 40b transmits a system participation notice including the device information of the information processing apparatus 200 to the device managing apparatus 100. The transmitted device information may include device network information such as an IP address, device identifying information such as a serial number, and type ID information such as a model name.

As described above, in the device managing system 1, the device managing apparatus 100 operates as follows in order to realize the software management function. The device managing apparatus 100 determines whether the installation target software requires license validation. Based on the product key PK of the software that requires license validation, the device managing apparatus 100 acquires from the license managing information 53D retained in the license validation unit 300 the number of available licenses. The device managing apparatus 100 then requests the license validation unit 300 to perform a license validation process in accordance with the acquired number of available licenses. The device managing apparatus 100 then sets an issued license (license code) in the image processing apparatus 200 (update target device) as a software update target.

Thus, the device managing system 1 performs license validation (issuance of a license) dynamically in accordance with the number of available licenses when a software update process is performed for the image processing apparatus 200 as a management target device.

Thus, in the device managing system 1, a license management operation can be automatically performed in an environment in which software installed in plural devices is managed. As a result, the operational burden on an administrator and the like can be reduced, and also human errors can be prevented.

In accordance with an embodiment of the present invention, the software management function described above may be realized when a program encoding the above-described various process sequences using a programming language adapted for the particular operating environment (platform) is executed by the CPU (such as the CPUs 106 and 211) of the apparatuses of which the system 1 is made up.

Such a program may be stored in a computer-readable recording medium (such as 103a or 214a). Examples of the recording medium 103a that can be read by the device managing apparatus 100 or the license validation unit 300 include a flexible disc, a compact disc (CD), and a digital versatile disk (DVD). Examples of the recording medium 214a that can be read by the image processing apparatus 200 include a SD memory card and a USB memory.

Thus, the program stored in the recording medium 103a can be installed in the device managing apparatus 100 or the license validation unit 300 via the drive unit 103 configured to read such a recording medium. Further, because the device managing apparatus 100 and the license validation unit 300 include the interface unit 107, the program may be downloaded via an electronic communications line and then installed.

In the image processing apparatus 200, the program may be installed via the external storage I/F 214 configured to read the recording medium 214a. Further, because the image processing apparatus 200 includes the network I/F 107, the program may be downloaded via an electronic communications line and then installed in the image processing apparatus 200.

While the license validation unit 300 has been described as being connected via the external network I (such as the Internet) in the foregoing embodiment, this is merely an example. In another embodiment, a license validation process may be performed in the device managing apparatus 100.

Although this invention has been described in detail with reference to certain embodiments, variations and modifications exist within the scope and spirit of the invention as described and defined in the following claims.

The present application is based on Japanese Priority Application No. 2009-159964 filed Jul. 6, 2009, the entire contents of which are hereby incorporated by reference.

What is claimed is:

1. A device managing apparatus for managing devices that are connected through a network, the device managing apparatus comprising:
a processor coupled to a storage device to perform a predetermined information process, wherein the processor is configured to execute a predetermined program to perform steps including:
(a) determining, in a case where a most recent version of particular software item that is installed in one device is to be installed in an other device that is different from the one device, a need for license validation for the most recent version of the particular software item to be installed in the other device;
(b) requesting to perform the license validation for the most recent version of the particular software item to be installed in the other device, depending on an available license for the particular software item which is determined in (a) as having a need for license validation; and
wherein performing license validation dynamically, by the device managing apparatus, in accordance with the number of available licenses when a software update process is performed for the image processing apparatus; and
wherein the processor is configured to perform the additional step of: setting a license code in the other device, said license code being generated based on: a product key allocated to the particular software item determined to require license validation; and device information of the other device in which the particular software item is to be installed or is installed; and
(c) requesting to set a license in the other device, said license being issued by a license validation apparatus that performs the license validation in response to a request to perform the license validation which is requested by (b).

2. The device managing apparatus according to claim 1, wherein the processor is configured to perform the additional steps of:
(d) confirming whether additional license is available for the particular software item determined in (a) as having a need for license validation; and
(e) requesting to perform the license validation on the particular software item based on a confirmation result obtained in (d).

3. The device managing apparatus according to claim 2, wherein the processor is configured to perform the additional steps of:
(f) requesting the license validation apparatus to perform the license validation on the particular software item for the other device upon confirmation in (d) that additional license is available for the particular software item determined in (a) as having a need for license validation, and
(g) notifying the one device that there is no available license upon confirmation in (d) that no additional license is available for the particular software item determined in (a) as having a need for license validation.

4. The device managing apparatus according to claim 1, wherein the processor is configured to perform the additional step of:
(h) setting a license code in the other device, said license code being generated based on:
a product key allocated to the particular software item determined to require license validation; and
device information of the other device in which the particular software item is to be installed or is installed.

5. The device managing apparatus according to claim 1, wherein the processor is configured to perform additional steps of:
(i) acquiring the number of available licenses for the particular software item which is determined in (a) as having a need for license validation, and
(j) confirming whether additional license is available for the particular software item determined in (a) as having a need for license validation, based on the number of available licenses acquired in (i).

6. The device managing apparatus according to claim 1, wherein the processor is configured to perform the additional steps of:
(k) managing a software update result of the other device in which the software item is to be installed or is installed; and
(l) recording the software update result of the device upon setting of the license in the other device.

7. A device managing system comprising a device, a device managing apparatus for managing the device and a license validation apparatus that are connected through a network, the device managing apparatus being configured to:
(a) determine, in a case where a most recent version of particular software item that is installed in one device is to be installed in an other device that is different from the one device, a need for license validation for the most recent version of the particular software item to be installed in the other device;
(b) request to perform the license validation for the most recent version of the particular software item to be installed in the other device, depending on an available license for the particular software item which is determined in (a) as having a need for license validation; and
wherein performing license validation dynamically, by the device managing apparatus, in accordance with the number of available licenses when a software update process is performed for the image processing apparatus; and
wherein the processor is configured to perform the additional step of: setting a license code in the other device, said license code being generated based on: a product key allocated to the particular software item determined to require license validation; and device information of the other device in which the particular software item is to be installed or is installed; and
(c) request to set a license in the other device, the license being issued by the license validation apparatus that performs the license validation in response to a request to perform the license validation which is requested by (b), and
(d) set the license acquired from the license validation apparatus as a validation result in the other device in which the software item is to be installed or is installed.

8. The device managing system according to claim 7, further comprising:
an available license number acquiring unit configured to acquire the number of available licenses for the software item determined to require license validation, and
a confirming unit configured to confirm whether there is the available license for the software item determined to require license validation based on the number of available licenses acquired by the available license number acquiring unit,
wherein the device managing apparatus is configured to request the license validation apparatus to perform license validation on the software item based on a confirmation result obtained by the confirming unit.

9. The device managing system according to claim 7, wherein the device managing apparatus is configured to request the license validation apparatus to perform license validation on the software item upon confirmation by the confirming unit that there is the available license for the software item determined to require license validation,
wherein the device managing apparatus is configured to notify the device that there is no available license upon confirmation by the confirming unit that there is no available license for the software item determined to require license validation.

10. The device managing system according to claim 7, wherein the device managing apparatus is configured to request to set a license code in the other device, said license code being generated based on:
a product key allocated to the software item determined to require license validation; and
device information of the other device in which the software item is to be installed, in the other device,
wherein the license validation apparatus is configured to generate the license code as the validation result.

11. The device managing system according to claim 7, wherein the setting unit is configured to set the license code sent from the license validation apparatus as the validation result in the other device in which the software item is to be installed or is installed.

12. The device managing system according to claim 7, wherein the license validation apparatus includes:
an information retaining unit configured to retain license managing information associating a product key allocated to the software item with the number of available licenses for the software item,
wherein the available license number acquiring unit is configured to access the information retaining unit and refer to the license managing information therein in order to acquire the number of available licenses for the software item determined to require license validation, based on the product key allocated to the software item.

13. The device managing system according to claim 7, further comprising:
an information managing unit configured to manage a software update result of the other device in which the software item is to be installed or is installed,
wherein the information managing unit is configured to record and manage the software update result of the device upon setting of the license in the other device by the setting unit.

14. A method for controlling a device managing apparatus for managing software installed in at least one device, the device managing apparatus including a processor to perform a predetermined information process, the method comprising:
(a) determining, in a case where a most recent version of particular software item that is installed in one device is to be installed in an other device that is different from the one device, a need for license validation for the most recent version of the particular software item to be installed in the other device;
(b) requesting to perform the license validation for the most recent version of the particular software item to be installed in the other device, depending on an available license for the particular software item which is determined in (a) as having a need for license validation; and
wherein performing license validation dynamically, by the device managing apparatus, in accordance with the number of available licenses when a software update process is performed for the image processing apparatus; and
wherein the processor is configured to perform the additional step of: setting a license code in the other device, said license code being generated based on: a product key allocated to the particular software item determined to require license validation; and device information of the other device in which the particular software item is to be installed or is installed; and
(c) requesting, by a setting unit, to set a license issued by a license validation apparatus that performs the license validation in response to a request to perform the license validation in the other device which is requested in (b).

* * * * *